(12) United States Patent
Jeffrey et al.

(10) Patent No.: US 9,769,143 B2
(45) Date of Patent: *Sep. 19, 2017

(54) CONTENT-BASED ASSOCIATION OF DEVICE TO USER

(71) Applicant: Gracenote, Inc., Emeryville, CA (US)

(72) Inventors: Michael Jeffrey, Orinda, CA (US); Steven D. Scherf, Fremont, CA (US); Markus K. Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,706

(22) Filed: Apr. 28, 2016

(65) Prior Publication Data

US 2016/0241540 A1    Aug. 18, 2016

Related U.S. Application Data

(63) Continuation of application No. 14/446,559, filed on Jul. 30, 2014, now Pat. No. 9,356,914.

(51) Int. Cl.
*H04L 29/06* (2006.01)
*H04L 9/32* (2006.01)
(Continued)

(52) U.S. Cl.
CPC .............. *H04L 63/08* (2013.01); *G06F 21/44* (2013.01); *G06F 21/6218* (2013.01); *H04L 63/0421* (2013.01); *H04L 63/0876* (2013.01); *H04M 1/72525* (2013.01); *H04N 21/233* (2013.01); *H04N 21/23418* (2013.01); *H04N 21/2541* (2013.01); *H04N 21/25875* (2013.01);
(Continued)

(58) Field of Classification Search
CPC ... H04L 63/0876; H04L 63/08; H04L 63/102; H04L 63/0421; H04W 12/06; H04W 12/08; H04W 4/00; H04W 4/001; H04W 8/22; H04W 8/24; G06F 21/73; G06F 21/44; H04M 1/72525; H04N 21/25875; H04N 21/23418; H04N 21/233
See application file for complete search history.

(56) References Cited

U.S. PATENT DOCUMENTS 5,115,501 A * 5/1992 Kerr ..................... G06F 9/4446
6,243,468 B1    6/2001 Pearce et al.
(Continued)

FOREIGN PATENT DOCUMENTS

WO    WO-2016018472 A2    2/2016
WO    WO-2016018472 A3    2/2016

OTHER PUBLICATIONS

"U.S. Appl. No. 14/446,559, Non Final Office Action mailed Sep. 8, 2015", 19 pgs.
(Continued)

*Primary Examiner* — Michael Simitoski
(74) *Attorney, Agent, or Firm* — McDonnell Boehnen Hulbert & Berghoff LLP

(57) ABSTRACT

Example methods and systems for content-based association of a device to a user are presented. In an example method, data corresponding to each of a plurality of items of content stored within a user device are accessed. A device identifier for the user device is generated based on the data. The device identifier is transmitted from the user device to a service device to associate the user device with a user.

20 Claims, 7 Drawing Sheets

(51) Int. Cl.

| | | |
|---|---|---|
| *H04N 21/258* | (2011.01) | |
| *H04M 1/725* | (2006.01) | |
| *H04W 12/08* | (2009.01) | |
| *H04W 12/06* | (2009.01) | |
| *H04N 21/439* | (2011.01) | |
| *H04N 21/44* | (2011.01) | |
| *H04N 21/658* | (2011.01) | |
| *H04N 21/233* | (2011.01) | |
| *H04N 21/234* | (2011.01) | |
| *G06F 21/44* | (2013.01) | |
| *G06F 21/62* | (2013.01) | |
| *H04N 21/254* | (2011.01) | |
| *H04N 21/4627* | (2011.01) | |
| *H04N 21/84* | (2011.01) | |
| *G06F 17/30* | (2006.01) | |
| *H04W 12/02* | (2009.01) | |

(52) U.S. Cl.
CPC ... *H04N 21/4394* (2013.01); *H04N 21/44008* (2013.01); *H04N 21/4627* (2013.01); *H04N 21/6582* (2013.01); *H04N 21/84* (2013.01); *H04W 12/06* (2013.01); *H04W 12/08* (2013.01); *H04W 12/02* (2013.01)

(56) References Cited

U.S. PATENT DOCUMENTS

| | | |
|---|---|---|
| 7,174,454 B2 | 2/2007 | Roskind |
| 7,240,364 B1 | 7/2007 | Branscomb et al. |
| 7,278,131 B2 | 10/2007 | Gunyakti et al. |
| 7,908,644 B2 | 3/2011 | Roskind et al. |
| 8,185,936 B1 | 5/2012 | Reeves et al. |
| 8,239,852 B2 | 8/2012 | Etchegoyen |
| 8,316,421 B2 | 11/2012 | Etchegoyen |
| 8,682,297 B2 | 3/2014 | Chevsky et al. |
| 8,868,923 B1 | 10/2014 | Hamlet et al. |
| 9,107,141 B2 | 8/2015 | Lai et al. |
| 9,356,914 B2 | 5/2016 | Jeffrey et al. |
| 2002/0073331 A1 | 6/2002 | Candelore |
| 2003/0033501 A1 | 2/2003 | Cooke et al. |
| 2004/0199770 A1 | 10/2004 | Roskind |
| 2005/0049957 A1 | 3/2005 | Vakili et al. |
| 2006/0282660 A1 | 12/2006 | Varghese et al. |
| 2009/0089869 A1 | 4/2009 | Varghese |
| 2009/0298478 A1 | 12/2009 | Tyhurst et al. |
| 2010/0107225 A1 | 4/2010 | Spencer |
| 2010/0205222 A1 | 8/2010 | Gajdos et al. |
| 2011/0093701 A1 | 4/2011 | Etchegoyen |
| 2011/0107405 A1 | 5/2011 | Kisters |
| 2011/0138078 A1 | 6/2011 | Barnes et al. |
| 2012/0072546 A1 | 3/2012 | Etchegoyen |
| 2012/0137340 A1 | 5/2012 | Jakobsson et al. |
| 2013/0002538 A1* | 1/2013 | Mooring ............. G06F 3/017 345/156 |
| 2013/0073859 A1 | 3/2013 | Carlson et al. |
| 2013/0090088 A1 | 4/2013 | Chevsky et al. |
| 2013/0166777 A1 | 6/2013 | Chen et al. |
| 2013/0167196 A1 | 6/2013 | Spencer et al. |
| 2013/0212654 A1 | 8/2013 | Dorfman et al. |
| 2014/0066015 A1 | 3/2014 | Aissi |
| 2014/0095320 A1 | 4/2014 | Sivaramakrishnan et al. |
| 2014/0123255 A1 | 5/2014 | Etchegoyen |
| 2014/0136333 A1 | 5/2014 | Shoshitaishvili et al. |
| 2014/0164418 A1 | 6/2014 | Etchegoyen |
| 2014/0237568 A1 | 8/2014 | Sista |
| 2014/0281561 A1 | 9/2014 | Etchegoyen et al. |
| 2015/0052579 A1 | 2/2015 | Yu |
| 2015/0172109 A1 | 6/2015 | Alhandy |
| 2016/0036782 A1 | 2/2016 | Jeffrey et al. |

OTHER PUBLICATIONS

"U.S. Appl. No. 14/446,559, Notice of Allowance mailed Jan. 29, 2016", 8 pgs.

"U.S. Appl. No. 14/446,559, Response filed Dec. 8, 2015 to Non Final Office Action mailed Sep. 8, 2015", 19 pgs.

"Device Fingerprint", http://en.wikipedia.org/w/index.php?title=Device_fingerprint&printable=yes (Mar. 10, 2014), 1-4.

"International Application Serial No. PCT/US2015/023430, International Search Report mailed Jan. 12, 2016", 2 pgs.

"International Application Serial No. PCT/US2015/023430, Written Opinion mailed Jan. 12, 2016", 10 pgs.

* cited by examiner

CONTENT-BASED ASSOCIATION OF DEVICE TO USER

RELATED APPLICATIONS

This application is a continuation of U.S. patent application Ser. No. 14/446,559, filed Jul. 30, 2014, which is incorporated herein by reference in its entirety.

COPY RIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2014, Gracenote, Inc. All Rights Reserved.

TECHNICAL FIELD

This application relates generally to data processing and, more specifically, to systems and methods for associating a device with a user based on content.

BACKGROUND

Users commonly employ several electronic devices, such as desktop computers, laptop computers, tablet computers, gaming systems, smart phones, and so on, over the course of a single day. Typically, some commonality in terms of applications, services, and other functionality may exist among multiple such devices, often leading to a commonality of content that is stored on the various devices, or that is otherwise accessible via the devices. Such content may include, for example, music or other audio files, video files, still image files, and text or document files.

In some applications executed on a user device, and in some services accessed over the Internet or other wide area network (WAN) by way of the device, the application or service may employ an identification of the user of the device to facilitate access to the application or service, to provide personalized content and/or functionality based on the identity of the user, and enable other user-specific actions.

However, users are increasingly wary of providing personal identifying information over the Internet due to ever-growing concerns of identity theft and the desire to remain anonymous. Web-based cookies, device media access control (MAC) addresses, and similar types of device and user identification are increasingly unavailable on mobile devices. Further, application tokens, server-based tokens, and other similar forms of anonymous user identification available from a server typically involve the use of an active Internet connection to access the tokens and, more importantly, aren't uniformly shared across the applications on mobile or embedded devices.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of example embodiments. It will be evident, however, to one skilled in the art that the present subject matter may be practiced without these specific details.

Figure 1:
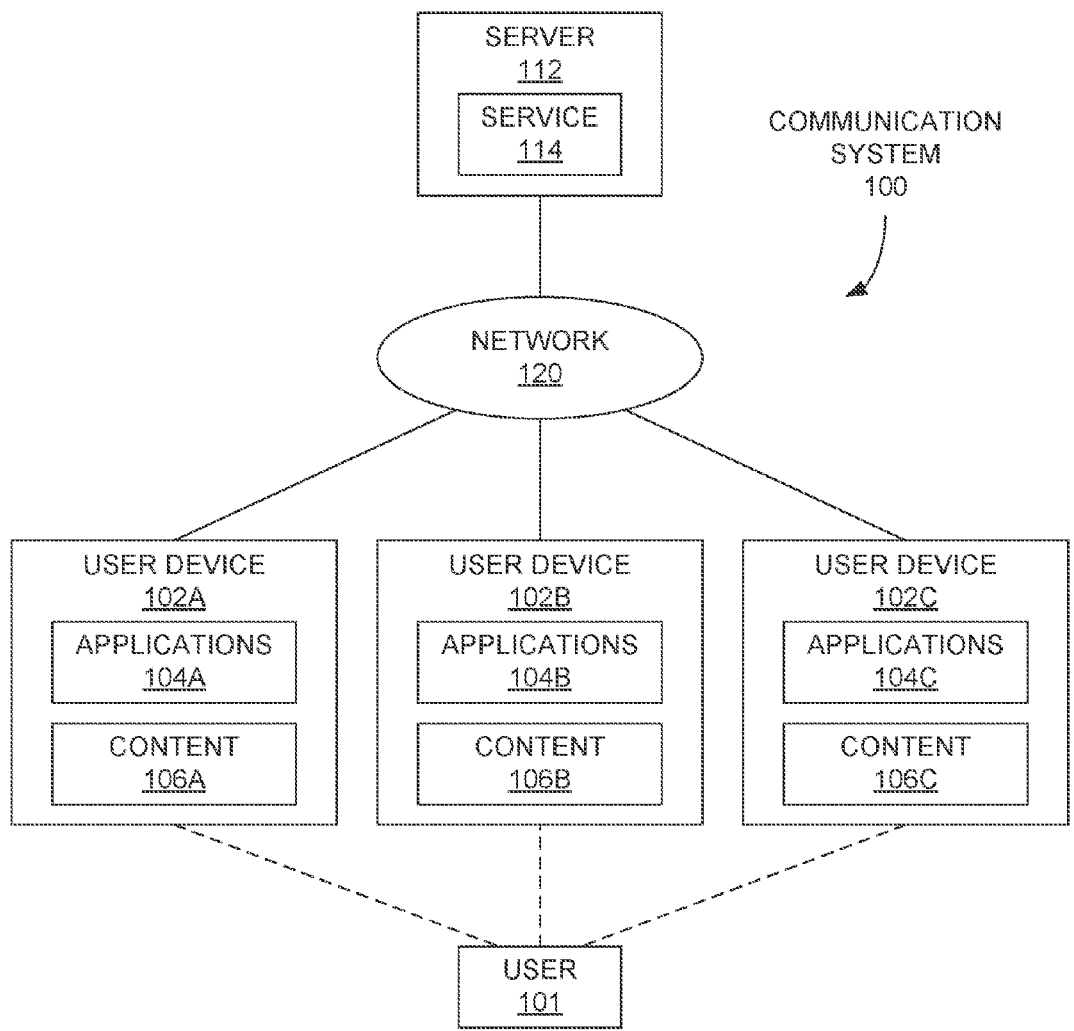
FIG. 1 is a block diagram illustrating an example communication system employing multiple user devices and a server.

FIG. 1 illustrates an example communication system 100 that may include at least one server 112 coupled by way of a network 120 to one or more user devices 102A, 102B, and 102C (or, alternatively, one or more user devices 102) being controlled or operated by a single user 101. In one example, the server 112 may be any communication node or system capable of exchanging information with the user devices 102 via the network 120 and processing that information, as is described in greater detail below. As shown in FIG. 1, the server 112 may operate as a service device that includes one or more services 114 that provide some service or functionality to each of the user devices 102. In some embodiments, each server 112 may be employed to provide a separate service 114 available to the user devices 102, and some plurality of servers 112 may operate as a group to provide a single service 114 or a group of related services 114.

The network 120 may be any communication network capable of transporting information between the server 112 and the user devices 102. Examples of the network 120 may be include, but are not limited to, one or more of wide area networks (WANs) (e.g., the Internet), cellular telephone data networks (e.g., 3G (third-generation) and 4G (fourth-generation) networks), local area networks (LANs), and other wireless and wired communication networks.

Each user device 102A, 102B, and 102C is shown as including one or more applications 104A, 104B, and 104C, respectively (alternatively, applications 104), and content 106A, 106B, and 106C, respectively (alternatively, content 106). While the example of FIG. 1 depicts three user devices 102, any other number of user devices 102 may be associated with a particular user 101 in other embodiments. Examples of the user device 102 may include, but are not limited to, a desktop computer, a laptop computer, a tablet computer, a smart phone, a gaming system, a smart television, or any other device capable of storing and/or access content 106.

Each of the user devices 102 may include one or more applications 104. The applications 104 may include, for example, audio generation and/or playback applications, video generation and/or playback applications, still image capture and/or display applications, email applications, Short Message Service (SMS) applications, word processing applications, document reader applications, graphics applications, web browser applications, and any other applications that access content. The content 106 may include, for example, audio files, audio/video files, still image files, textual files (e.g., documents, texts, emails, and so on), graphics files, contact information files, web browser history, encrypted and/or decrypted security certificates/keys, and any other type of content, including media content. In some examples, access of one or more of the applications 104 operating on a user device 102 may be limited to some proper subset of the content 106 stored on, or accessible by way of, the user device 102. For example, a video playback application may have access only to video and audio/video files, but not to contact information files. In other examples, one or more of the user devices 102 could provide a function or service associated with the content 106 that is not associated with a particular application 104, but by way of another function or service, such as a system function provided by way of an operating system executing on the user device 102.

Within the environment of the communication system 100, as is discussed in greater detail below, a user device 102 may process its content 106 to produce an identifier for that user device 102 that is ultimately provided to the server 112. In some examples, the identifier for the user device 102 may be considered a digital "fingerprint" of the content 106 stored on, or otherwise accessible via, the user device 102. Presuming that the content 106 among user devices 102 of the same user 101 is at least somewhat similar, and/or presuming that the content 106 of the same user device 102 evolves while maintaining some "core" content, the server 112 can employ the generated device identifiers to correlate one or more user devices 102 with its particular user 101 in an anonymous fashion without requesting explicit user information, thus reducing the possibility of identity theft and increasing the overall security of the communication system 100. Other potential aspects of the communication system 100 are described in greater detail below.

Figure 2:
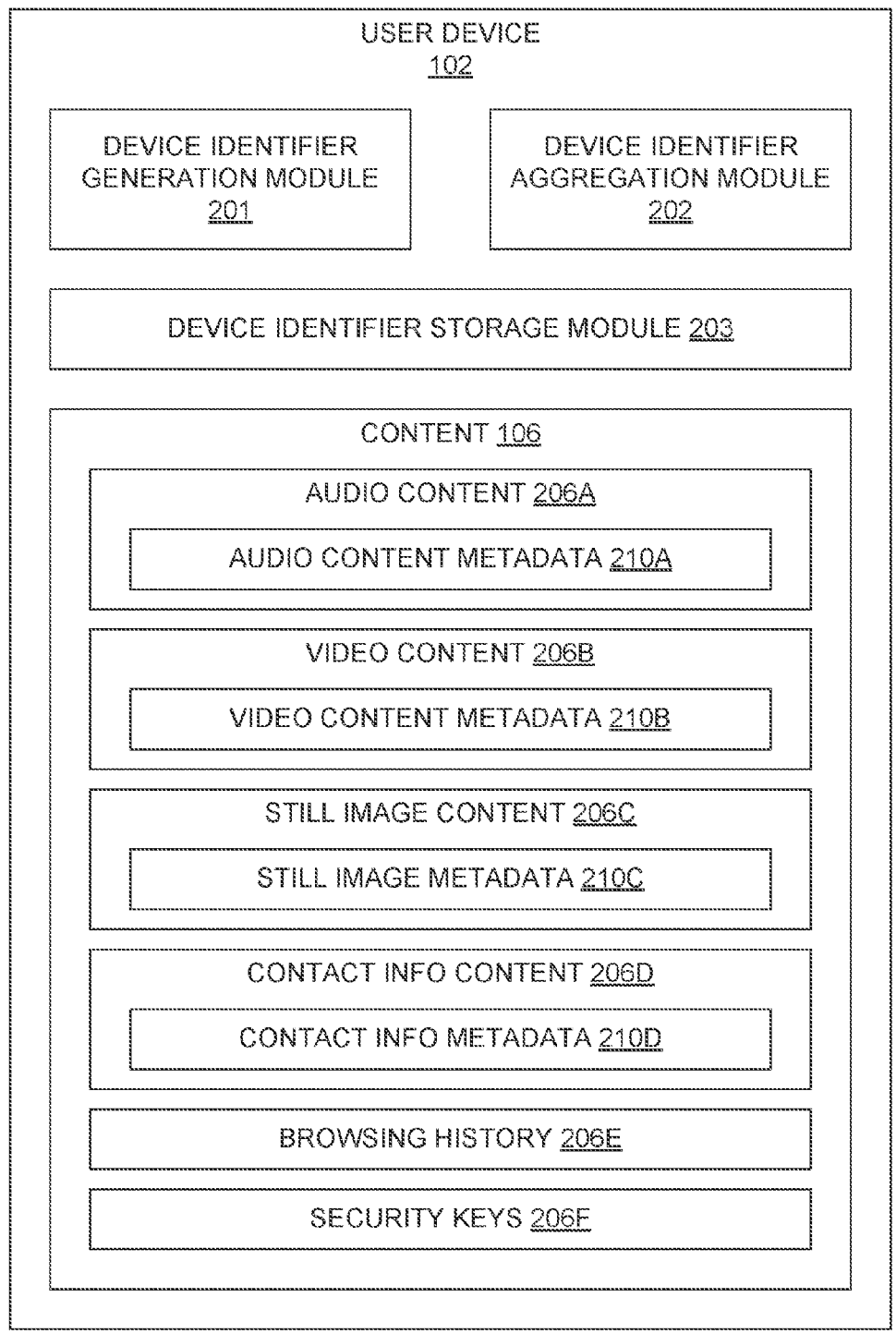
FIG. 2 is a block diagram illustrating an example user device employable in the communication system of FIG. 1.

FIG. 2 is a block diagram illustrating an example of the user device 102 employable in the communication system 100 of FIG. 1, which may serve as any of the user devices 102A, 102B, and/or 102C. As illustrated in FIG. 2, the user device 102 may include a device identifier generation module 201, a device identifier aggregation module 202, a device identifier storage module 203, and the content 106. Also as shown in FIG. 2, the content 106 may include, for example, audio content 206A, video content 206B, still image content 206C, contact information content 206D, web browsing history 206E, and security keys 206F (or, alternatively, content 206 in the aggregate). Other types of content 106 may also be included, as mentioned above, but are not discussed explicitly herein to simplify and focus the following discussion. Also, other modules, such as user interface modules, communication interface modules, location determination modules, and others not depicted in FIG. 2 may be included in the user device 102, but are not described below to emphasize certain aspects of the embodiments presented herein.

Some of the types of content 106 may also include, or at least be associated with, metadata 210 that includes at least some descriptive information corresponding to its related content 106. As depicted in FIG. 2, for example, the audio content 206A may include audio content metadata 210A, the video content 206B may include video content metadata 210B, the still image content 206C may include still image metadata 210C, and the content information content 206D may include (or may be considered, in and of itself) content information metadata 210D (or, more generally, content metadata 210).

In some examples, the metadata 210 associated with particular content 206 may depend on the type of content 206. For example, the audio content metadata 210A may include, for example, a title of the associated audio content 206A (e.g., an audio file), a run time of the associated audio content 206A, a hash and/or fingerprint of a binary file representing the associated audio content 206A (or a defined portion thereof), parameters of an encoded file representing the associated audio content 206A (e.g., compression rate), a play count of the associated audio content 206A (e.g., a number of times the audio file has been played), a size (e.g., in bytes) of the associated audio content 206A, a capture date and/or time of the associated audio content 206A, a genre of the associated audio content 206A, an artist of the associated audio content 206A, a composer of the associated audio content 206A, a viewer rating of the associated audio content 206A, an album in which the associated audio content 206A appears, and so on.

By contrast, the video content metadata 210B may include, for example, a title of the associated video content 206B (e.g., a video file), a run time of the associated video content 206B, a hash and/or fingerprint of a binary file representing the associated video content 206B (or a defined portion thereof), parameters of an encoded file representing the associated video content 206B (e.g., color space, compression rate, and/or frame rate), a play count of the associated video content 206B, a size (e.g., in bytes) of the associated video content 206B, a capture date and/or time of the associated video content 206B, a genre of the associated video content 206B, a director of the associated video content 206B, cast and/or crew of the associated video content 206B, a viewer rating of the associated video content 206B, and the like.

In some examples, the still image metadata 210C may include, for instance, a title of the associated still image content 206C (e.g., a still image file), a size (e.g., in bytes) of the associated still image content 206C, dimensions (e.g., in pixels) of the associated still image content 206C, a capture date and/or time of the associated still image content 206C, a geographic location where the associated still image content 206C was captured (e.g., a location name or Global Positioning System (GPS) coordinates), access and/or modification dates of the associated still image content 206C, parameters of a compressed file representing the associated still image content 206C (e.g., color space and/or compression ratio), hashes of human-assigned freeform tags assigned to the still image content 206C, and so forth. Other metadata, such as, for example, any fields of the Exchangeable image file format (Exif) specification or the like may also be included in some embodiments.

The content information metadata 210D may include, for example, for each person indicated in the content information content 206D, a name of the contact, a work phone number of the contact, a cell phone number of the contact, a work email address of the contact, a personal email address of the contact, a home address of the contact, creation and/or modification dates and/or times of the contact, and so on. Other types of metadata 210 may be included for this and other types of content 206 in other embodiments.

The device identifier generation module 201 of FIG. 2 may be configured to generate an identifier for the user device 102 based on at least a portion of the content 206 and/or the metadata 210 corresponding with the content 206. In some embodiments, the device identifier generation module 201 may be associated with a particular application 104 operating within the user device 102. Accordingly, in such examples, the device identifier generation module 201 may only access the content 206 and/or associated metadata 210 that is available to that particular application 104. For instance, a video player application 104 may only be configured to access video content 206B and/or its associated metadata 210B. In that case, the device identifier generation module 201 may only employ the video content 206B and/or the video content metadata 210B to generate a device identifier to be used in conjunction with the video player application 104. As a result, the device identifier generation module 201 may employ only that content 206 for which a user has provided permission to access, or content 206 that the application 104 generally is permitted to access to perform its assigned functions, to generate a device identifier. In other examples, the device identifier generation module 201 may access the content 206 and associated metadata 210 for a number of related applications 104, such as those that are provided by the same application provider. In yet other embodiments, the device identifier generation module 201 may access all (or nearly all) content 206 and associated metadata 210 available within the user device 102.

In some embodiments, the device identifier generation module 201 may select a portion of available content 206 and/or metadata 210 based on a date and/or time associated with each item of content 206 and/or metadata 210. For example, the device identifier generation module 201 may select content 206 and/or metadata 210 that is older than some minimum "age" so that newer items of content 206 that have just been added, and thus may not remain on the user device 102 for a significant time period, are not included in the device identifier generation. In other examples, the device identifier generation module 201 may weight certain content 206, such as, for example, older, more stable content 206, more heavily or strongly than other content 206, thus contributing more to the generated device identifier. Consequently, the content 206 and/or metadata 210 utilized to generate the device identifier in this example may represent a "core" of the content 206 stored on the device, thus possibly resulting in a stable identifier for the user device 102 that changes relatively little over time. Further, in some examples, content 206 that is deemed more stable, and thus may be associated with a stronger weight, may be reinforced from time to time. For example, each time the user device 102 checks in with an identification service, the device identifier may be matched against identifiers previously obtained at the service from the user device 102. Such matching may cause the weight associated with the content 206 and/or metadata 210 to be reinforced, strengthened, or maintained. Also, more volatile or less stable content 206 and/or metadata 210 may be marked with a flag or otherwise denoted to indicate to the device identifier generation module 201 that such content 206 and/or metadata 210 may be ignored in the generation of the device identifier.

In an example, the device identifier generation module 201 generates the device identifier based primarily on the metadata 210 to which the device identifier generation module 201 has access, as the metadata 210 may be easily identified and obtained, is often much smaller in size than the associated content 206, and is thus likely to be easier and faster to process in generating the identifier for the user device 102.

As the content 206 and/or associated metadata 210 may correlate with the user 101 employing the user device 102, the device identifier generated by the device identifier generation module 201 may be considered to represent the user 101. Further, due to similarities between the current content 206 and/or associated metadata 210 that remain over time within a user device 102, different device identifiers generated at different times for the same user device 102 may be similar to a degree such that the device identifiers may be detected as representing the same user device 102, and thus the same user 101.

Content 206 and associated metadata 210 between user devices 102 of the same user 101 may often be synchronized to some degree between the user devices 102, such as, for example, by way of a server 112 providing the same service 114 to the user devices 102. As a result, with the content 206 and associated metadata 210 of two or more user devices 102 of the same user 101 possibly being somewhat similar, device identifiers generated for the two user devices 102 may also be similar. Consequently, either or both of the device identifiers may be useful as identifiers for the user 101.

In some examples, additional information may be employed in conjunction with the device identifiers to associate two or more user devices 102 to the same user 101. Such additional information may be advantageous in situations in which the content of two user devices 102 for two different users 101 are so similar as to indicate that the users 101 are one and the same. For example, location information, such as GPS location information, reverse Internet Protocol (IP) address mapping, and/or other information, may be employed as a weighting factor, with stronger weights being associated with user devices 102 that are located in the same general geographic area. Further, in cases in which such a weighting factor is low, thus indicating that two separate user devices 102 are not physically located closely to each other, may not reduce the effect of device identifiers that indicate a strong association of the two or more user devices 102 to the same user 101, as different user devices 102 of the same user 101 may be purposely positioned in different locations (e.g., due to the user 101 travelling and leaving one of the user devices 102 at home) or the user 101 may employ different Internet services for different user devices 102. In other examples, the additional information may include explicit identifiers obtained from third-party authentication services, such as those offered by Facebook® or Google®, which may be used to more correctly associate two or more user devices 102 to the same user 101. In yet other embodiments described below, in which groups of users 101 that access or download the same or similar content 106 are to be identified for purposes of advertising, content recommendations, or the like, such additional information may not be desired.

The device identifier generation module 201 may process either or both of the content 206 and associated metadata 210 of a user device 201 by any of a number of techniques to produce a device identifier for the user device 201. In an embodiment, the device identifier generation module 201 may execute a hash function on the content 206 and/or associated metadata 210 to generate the device identifier. For example, the device identifier generation module 201 may hash the title, artist, track duration, and/or other metadata 210 for audio tracks on the user device 201, resulting in a set or string of symbols serving as the device identifier.

In another embodiment, the device identifier generation module 201 may execute a hash function on a portion of the content 206 and/or associated metadata 210, and then organize the resulting sets of symbols, possibly according to another portion of the content 206 and/or metadata 210. For example, the device identifier generation module 201 may hash the title and artist metadata 210 for each audio track on the user device 201 individually, resulting in multiple sets or strings of symbols, which may then be sorted by track duration or other metadata associated with the audio tracks, resulting in a single set or string of symbols serving as the device identifier. The device identifier generation module 201 may employ myriad other processing methods for generating a limited-length device identifier from multiple data inputs, including hashing and other computational methods, in other embodiments to generate the device identifier.

The device identifier aggregation module 202 may be configured to aggregate or otherwise combine two or more device identifiers generated by the device identifier generation module 201 to generate yet another device identifier for the user device 102. In one example, the device identifier aggregation module 202 may concatenate or otherwise group multiple device identifiers together to form a sort of aggregate device identifier in which the original individual device identifiers remain observable or retrievable. In some examples, each of a set of device identifiers may possess differing levels of "entropy," or degree of uncertainty or randomness that may be represented in each identifier. As a result, the greater level of entropy associated with a particular device identifier, the more likely that the device identifier is unique from others, and thus the more likely that the user 101 associated with the device identifier may be distinguished from other users 101. Accordingly, one or more of the device identifiers may be employed depending on the needs of the user device 102 to distinguish the user 101 from other users. In other examples, the multiple device identifiers may be combined mathematically in some fashion to form a sort of composite device identifier that retains a format similar to each of the original device identifiers. Many other methods or means of aggregating or combining device identifiers for the user device 102 may be employed in other examples.

In yet other examples, the device identifier aggregation module 202 may remove or delete one or more device identifiers from the user device 102, such as those device identifiers that are duplicates or near-duplicates of one or more device identifiers previously generated, or those device identifiers that are extremely different (e.g., outliers) from one or more previous device identifiers. In other examples, the device identifier aggregation module 202 may consolidate the device identifiers in such a manner that the effect of content 206 that is only stored on the user device 102 for a relatively short time period, and thus are reflected in only some device identifiers, but not in earlier or later device identifiers, may be removed.

The device identifier storage module 203 may store device identifiers generated, aggregated, or otherwise processed by either or both of the device identifier generation module 201 and the device identifier aggregation module 202. In one example, the device identifier storage module 203 may organize the stored device identifiers according to the particular applications 104 for which each device identifier was generated. Further, the device identifier storage module 203 may transmit to the server 112 one or more of the stored device identifiers for use in, for example, identifying the user 101 associated with the user device 102.

Transmitting one or more device identifiers to the server 112 may thus cause the server 112 to facilitate access to particular functions or services provided by the server 112 to the user device 102. In some embodiments, the user device 102 may employ the stored device identifiers to allow one or more applications 104 executing on the user device 102 to provide specific functions or services without the use of the server 112, such as during times when the user device 102 is not communicatively connected to the network 120.

While the above discussion focuses on the identification of multiple user devices 102 to the same user 101, multiple user devices 102 belonging to different users 101 may be grouped according to similar content 106 being stored on, or accessed by, the user devices 102 to identify the associated users 101 as a group. The users 101 of the same group may thus belong to a similar demographic group, or exhibit the same behavioral, content usage, or content consumption characteristics, which may be useful for advertising and content recommendation purposes. For example, users 101 that tend to store or watch the same video programs, songs, and the like, as indicated by device identifiers that are based on such content 106, may be associated with a particular group to which content recommendations, advertising, and so on are to be targeted. Further, in some examples, the device identifiers, by way of their relative differences, may indicate a logical distance between one or more users 101 and a core group of the users 101. These differences may be caused, for example, by how many video programs that define the group are stored on a particular user device 102 of the user 101, which video programs differentiate the user 101 from other users 101 of the group, and so on. Such information may be determined by processing the content 106 of the user devices 102 directly, by employing the content access history of a user device 102 at the server 112, and/or by other means. The number of times a particular video program has been played, as well as information indicating that a program has been downloaded, but not played, may also be taken into account. Further, the differences between stable and volatile content 106, as described above, may also be utilized in determining membership of a particular user 101 within the group, the relative strength of that membership, and so on.

Figure 3:
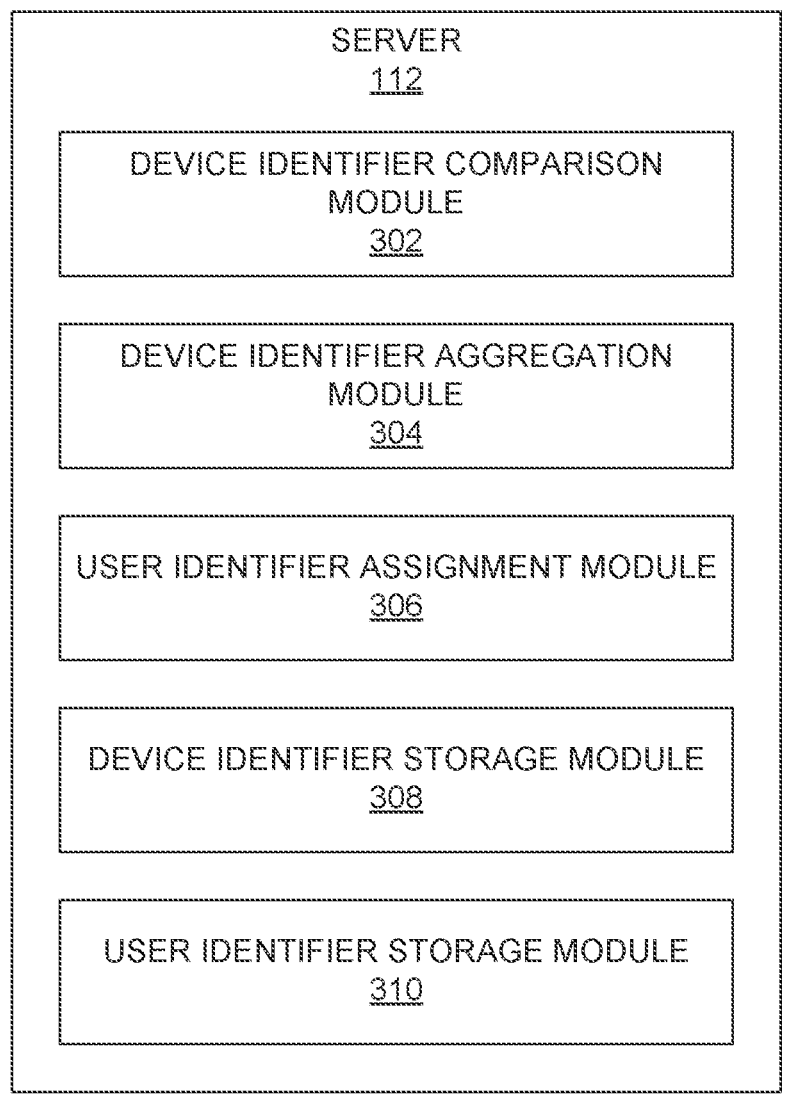
FIG. 3 is a block diagram illustrating an example server employable in the communication system of FIG. 1.

FIG. 3 is a block diagram illustrating an example server 112 employable in the communication system 100 of FIG. 1. As depicted in FIG. 3, the server 112 may include one or more of a device identifier comparison module 302, a device identifier aggregation module 304, a user identifier assignment module 306, a device identifier storage module 308, and a user identifier storage module 310. Other modules, such as a network interface module and a user interface module, may be included in the server 112, but are not discussed further below to focus on the device and user identifier aspects of the server 112.

The device identifier comparison module 302 may be configured to compare multiple device identifiers received from one or more user devices 102 to determine which device identifiers may be associated with the same user 101. In some embodiments, one or more of the device identifiers may have just been received, while others of the device identifiers may have been previously received and stored at the server 112. In one example, the device identifier comparison module 302 may employ a genetic sequencing algorithm to compare different device identifiers to determine if they represent essentially the same content 206 and/or metadata 210 despite relatively minor differences between the content 206 and/or metadata 210 employed to generate the device identifiers. Other methods or algorithms of determining whether two or more different device identifiers represent the same user 101, such as fuzzy logic algorithms, latent semantic analysis (LSA), latent semantic indexing (LSI), and other methods of correlating different symbols together based on a magnitude of the differences between the symbols, may be used in other embodiments.

Based on a determination in the device identifier comparison module 302 that two or more different device identifiers represent the same user 101, the device identifier aggregation module 304 may associate the two device identifiers in some way to record their relationship with the same user 101. In some examples, the device identifier aggregation module 304 may collect or store the identifiers as a group and/or may combine or aggregate the device identifiers in some manner, such as by concatenating the device identifiers, or by combining the device identifiers mathematically, to generate a new device identifier, as described above with respect to the device identifier aggregation module 202 of FIG. 2. In yet other embodiments, the device identifier aggregation module 304 may delete or remove one or more of the device identifiers at the server 112, such as those device identifiers that are duplicates or near-duplicates of one or more device identifiers that have been associated with the same user 101. The device identifier aggregation module 304 of the server 112 may also perform one or more other functions described above in conjunction with the device identifier aggregation module 202 of the user device 102 in other implementations.

The user identifier assignment module 306 may be configured to assign a user identifier for the user 101 to one or more of the device identifiers determined to correspond to that user 101, especially if such a user identifier has not already been assigned to the user 101. In some implementations, the user identifier assignment module 306 may generate a user identifier that is formatted to be compatible with a particular application 104 or service 114 prior to assigning the user identifier to the one or more device identifiers. In other embodiments, one or more of the device identifiers may serve as the user identifier, thus possibly eliminating the need to generate a separate user identifier in some cases.

The device identifier storage module 308 and the user identifier storage module 310 are configured to store the received, aggregated, and/or combined device identifiers and the user identifiers, respectively, as described above. The device identifiers and the user identifiers may be stored at the server 112 or at a storage device communicatively coupled with the server 112. In some examples, one or more stored user identifiers of a user 101 are associated with the device identifiers corresponding to the same user 101. As a result, the user identifiers and associated device identifiers may be stored together in some embodiments.

In some user devices 102, at least one of the specific applications 104 and/or services 114 may possess its own restricted environment, sometimes referred to as a "sandbox," within which the application 104 and/or service 114 may access or process only certain types of content 206 and corresponding metadata 210. In such examples, at least some of the device identifiers may be specifically linked or otherwise associated with their corresponding applications 104 and/or services 114. Accordingly, in these embodiments, the device identifier storage module 308 and the user identifier storage module 310 may organize the device identifiers and user identifiers according to application 104 or service 114.

Additional aspects of the user device 102 of FIG. 2 and the server 112 of FIG. 3 are discussed below in connection with the flow diagrams of FIGS. 4, 5, and 6.

Figure 4:
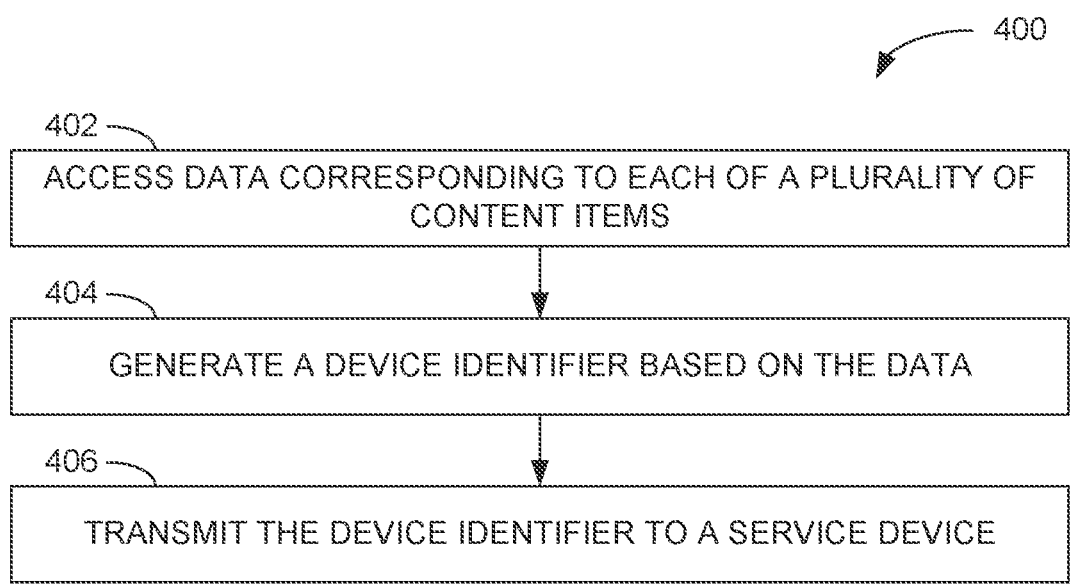
FIG. 4 is a flow diagram illustrating an example method of operating a user device employable in the communication system of FIG. 1.

FIG. 4 is a flow diagram illustrating an example method 400 of operating a user device 102 employable in the communication system 100 of FIG. 1. While the example user device 102 of FIG. 2 is presumed to perform the operations of method 400, other examples of the user device 102 not specifically discussed herein may also be employed to perform these operations.

In the method 400, data corresponding to each of a plurality of items of content 206 may be accessed (operation 402). In the particular examples discussed below, the data employed is the metadata 210 for each of the plurality of items of content 206. However, in other examples, the items of content 206, or some portion thereof, may be employed instead of, or in addition to, the metadata 210. In some examples, the content 206 accessed may be those items of content 206 associated with a particular application 104 or service 114 for which a user 101 of the user device 102 is to be identified. In some embodiments, the items of content 206 being accessed may be selected based on a particular creation date and/or time, as mentioned above. In other implementations, the items of content 206 themselves may be accessed, or both the items of content 206 and associated metadata 210 may be employed.

A device identifier may be generated based on the accessed data (e.g., metadata 210) (operation 404) by any one or more of the methods described above, as well as any other methods available for generating a unique device identifier based on a set of data associated with the content 206.

In some examples, the accessing of the metadata 210 (operation 402) and the generation of the device identifier based on that metadata 210 (operation 404) may be performed periodically at a sufficient rate such that changes in the metadata 210, and the resulting changes in the generated device identifiers, are small enough for the server 112 to recognize that two consecutive device identifiers received from the same user device 102 are determined to represent the same user 101 of the user device 102. In another example, the rate at which the accessing and generation operations are performed at the user device 102 may be based on the rate at which the associated content 106 is being added, deleted, and/or otherwise changed at the user device 102. For example, device identifiers may be generated at a relatively high rate if new content 106 is being created or stored, or if previously stored content 106 is being deleted, at a high rate. In yet other embodiments, newer content 106 being added or deleted from the user device 102 may not result in newer device identifiers being generated if the older, more stable portions of the content 106 are allowed to remain in the user device 102 for long periods of time.

The generated device identifier may be transmitted to a service device, such as the server 112 (operation 406) for comparison, storage, and other purposes therein as described below in conjunction with FIGS. 5 and 6. Also, as explained above, the newly generated device identifier may be stored at the user device 102, combined or aggregated with previously generated device identifiers, or even deleted from the user device.

In some examples, the generation of a new device identifier may be initiated as the result of an application 104 beginning execution, or upon access of a service 114 at the server 112. As a result, the user device 102, in one embodiment, may first transmit a previously generated and transmitted device identifier, such as the most recently generated device identifier, to the server 112 to log in the user device 102 with the server 112. The user device 102 may then access the current content metadata 210 (which may have changed since the last login with the server 112), generate a new device identifier, and transmit the new identifier to the server 112 so that the server 112 may be updated with the latest version of the device identifier. In some examples, the user device 102 may access the metadata 210, generate the new device identifier, and transmit the new device identifier to the server 112 in response to the user 101 exiting the application 104 or terminating access to the service 114 to update the server 112 accordingly.

While the operations 402-406 of method 400 are shown in FIG. 4 as being performed in a particular order, other potential orders of operation, including concurrent or overlapping execution of at least portions of the operations 402-406, may also be possible.

Figure 5:
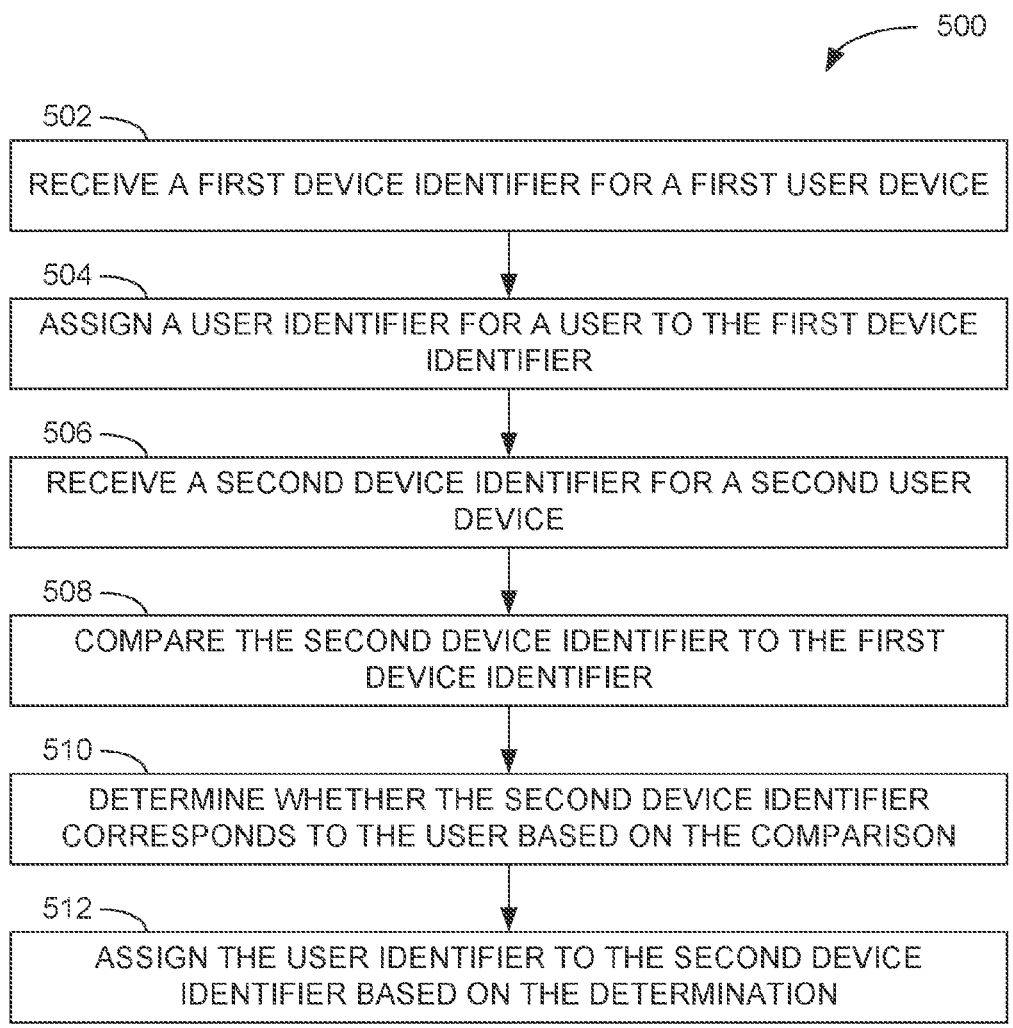
FIG. 5 is a flow diagram illustrating an example method of operating a server employable in the communication system of FIG. 1.

FIG. 5 is a flow diagram illustrating an example method 500 of operating a server 112 employable in the communication system 100 of FIG. 1. While the example server 112 of FIG. 3 is presumed to perform the operations of method 500, other examples of the server 112 not specifically discussed herein may also be employed to perform these operations.

In the method 500, a first device identifier may be received from a first user device 102 (operation 502). As described above, the first device identifier may be based on metadata 210 corresponding to a plurality of items of content 206 stored or accessible at the first user device 102. In at least some examples, the first device identifier also may be stored at the server 112. In other embodiments, the first device identifier, as well as other device identifiers discussed below, may be based on at least some items of content 206, or some combination of the content 206 and its associated metadata 210.

A user identifier for a user 101 may be assigned to the first device identifier in response to the receiving of the first device identifier (operation 504). In one example, the first device identifier may be the first such identifier received from the first user device 102, thus causing the assignment. In another example, the user identifier may have been assigned to a previously received device identifier for the first user device 102, and the first device identifier may compare favorably to the previously received device identifier, thus indicating that the user identifier is to be assigned to the first device identifier.

Continuing with the method 500, a second device identifier may be received from a second user device 102 (operation 506). The second device identifier may be based on metadata 210 corresponding to a plurality of items of content 206 stored or accessible at the second user device 102. In at least some embodiments, the second device identifier also may be stored at the server 112.

The server 112 may then compare the second device identifier to the first device identifier (operation 508), such as by way of a genetic sequencing algorithm described above, and determine whether the second device identifier corresponds to the user 101 based on the comparing of the second device identifier to the first device identifier (operation 510). Based on a determination that the second user identifier corresponds to the user 101, the user identifier may be assigned to, or otherwise associated with, the second device identifier (operation 512), thus indicating that the first user device 102 and the second user device 102 correspond to the same user 101 by way of similarities in content 206 stored at the user devices 102.

In some examples, based on the user identifier being assigned to the second device identifier, the server 112 may transmit the user identifier to the second user device 102. An application 104 operating in the second user device 102 may employ the received user identifier to gain access to a service 114 of the server 112 associated with the application 104. For example, the operation of the application 104 may be directed or controlled based on user preferences or history information associated with the user identifier. In other examples, the application 104 may not require the use of the user identifier to guide its operation on the second user device 102, because the second device identifier, as stored in the second user device 102 and the server 112, may serve as the user identifier for the user 101.

Also, a subsequent device identifier may be received at the server 112 from the second user device 102 at some point after the reception of the second device identifier, thus possibly being based on metadata 210 for content 206 that is slightly different from the content 206 that resided on the second user device 102 at the time the second device identifier was generated. In this example, the server 112 may compare the subsequent device identifier with the second device identifier and, if these two device identifiers compare favorably, the server 112 may associate the subsequent device identifier with the second device identifier for the second user device 102, thus keeping information regarding the content 106 at the second user device 102, as indicated in the subsequent device identifier, up-to-date at the server 112. In some embodiments, a favorable comparison may be obtained by use of a predefined threshold and an appropriate distance function; by dynamic adjustment of the threshold based on a history of device identifiers from the same user device 102; by use of a dynamic threshold between the closest matching device identifier in a reference set of previously-received device identifiers and other closest, but still somewhat dissimilar, device identifiers; and/or by other processing functions. In some examples, differences between the subsequent device identifier and the second device identifier may be detected to determine a difference between the items of content 206 upon which the second device identifier is based, and the items of content 206 upon with the subsequent device identifier is based.

Figure 6:
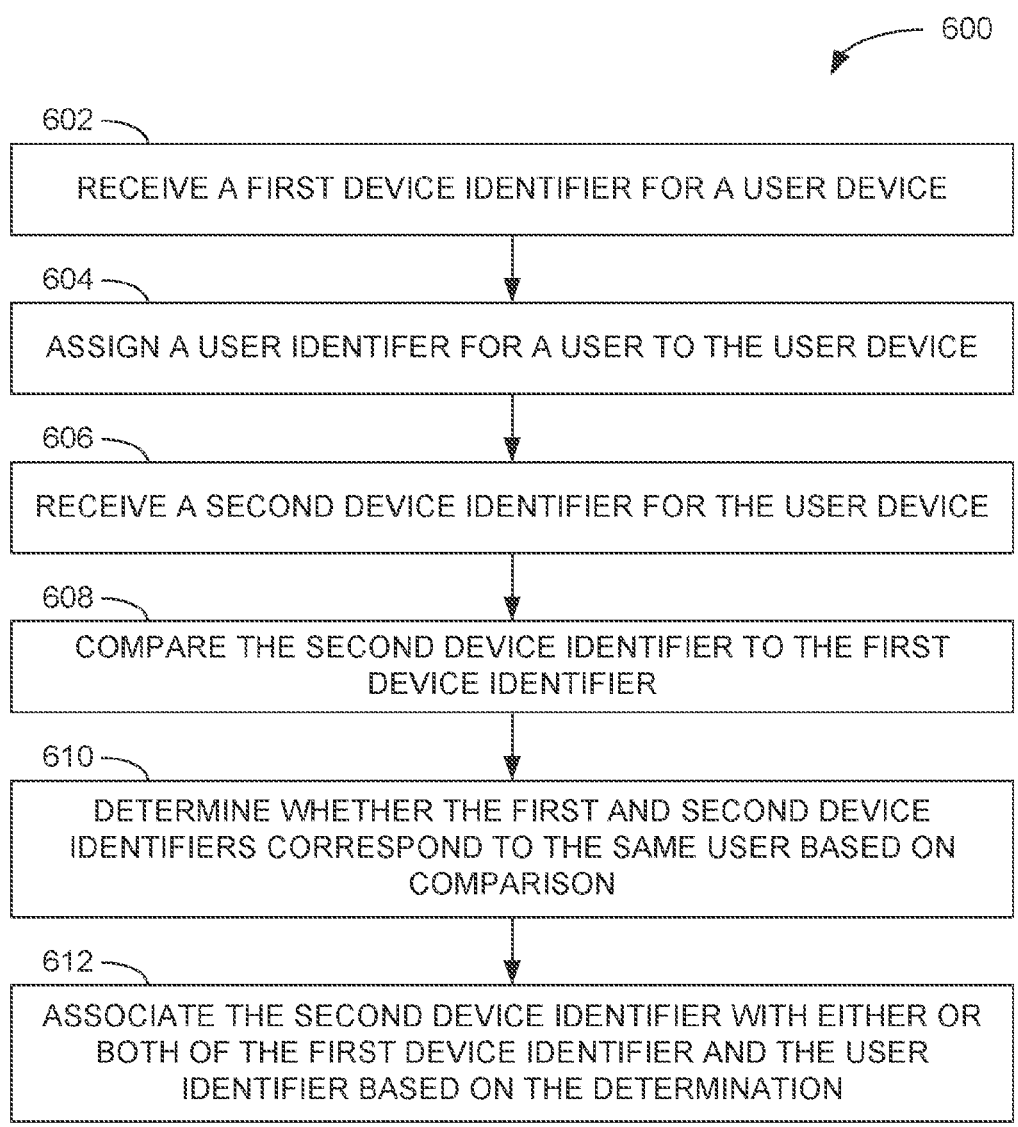
FIG. 6 is a flow diagram illustrating another example method of operating a server employable in the communication system of FIG. 1.

FIG. 6 is a flow diagram illustrating another example method 600 of operating a server 112 employable in the communication system of FIG. 1. As opposed to the method 500 of FIG. 5, in which the server 112 may associated two separate user devices 102 to the same user 101 based on content 206 similarity, the method 600 of FIG. 6 allows the server 112 to track changes in the content 206 of a single user device 102 while maintaining the association of the user 101 with the user device 102.

In the method 600, the server 112 receives a first device identifier from a user device 102 (operation 602). As described above, the first device identifier may be based on metadata 210 corresponding to a plurality of items of content 206 stored or accessible at the user device 102, on the content 206, or on some combination thereof. In at least some examples, the first device identifier also may be stored at the server 112.

A user identifier for a user 101 may be assigned to the first device identifier in response to the receiving of the first device identifier (operation 604). In one example, the first device identifier may be the first such identifier received from the user device 102, thus initiating the assignment. In another example, the user identifier may have been assigned to a previously received device identifier for the user device 102, and the current device identifier may compare favorably to the previously received device identifier, thus indicating that the user identifier is to be assigned to the current device identifier.

Continuing with the method 600, a second device identifier may be received from the same user device 102 (operation 606) after the reception of the first device identifier. As a result, the second device identifier may be generated based on metadata 210 corresponding to a plurality of items of content 206 stored or accessible at the user device 102 at a point in time after the generation of the first device identifier at the user device 102. Consequently, the second device identifier may be different than the first device identifier based on differences in the content 206 at the user device 102 between the time the first device identifier was generated and the time the second device identifier was generated. In at least some embodiments, the second device identifier also may be stored at the server 112.

The server 112 may then compare the first identifier and the second identifier (operation 608), such as by way of a genetic sequencing algorithm described above, and determine whether the first and second device identifiers correspond to the same user 101 based on the comparing of the second device identifier to the first device identifier (operation 610). Based on a determination that the first and second device identifiers correspond to the same user 101, the server 112 may associate the second device identifier with either or both of the first device identifier and the user identifier (operation 612). The server 112 may then employ the second device identifier as an updated version of the first device identifier for subsequent comparisons with newer device identifiers received from the user device 102.

In one example, an application 104 of the user device 102 may have been reinstalled between the time the first device identifier was generated and the time the second device identifier was generated, thus possibly causing a difference in the content 206 stored on the user device 102 that is associated with the application. In this example, the server 112 may be able to reassign or relate the user identifier to the reinstalled application 104 if the content 206 is not significantly different between the times before and after the reinstallation.

In another embodiment, the first device identifier may be associated with a first application 104 installed in the user device 102 that may access a first group of the items of content 206 used to generate the first device identifier, and the second device identifier may be associated with a second application 104 installed in the user device 102 that may access a second group of the items of content 206 used to generate the second device identifier. In this instance, the first group of the items of content 206 may overlap the second group of items of content 206 such that the server 112 may be able to determine that the first device identifier and the second device identifier correspond to the same user device 102, and hence the same user 101.

Various embodiments described above ascribe specific operations to the user devices 102 and the server 112. In other embodiments, at least some of the operations or tasks described above in connection with the user devices 102 may instead be performed in the server 112, and vice-versa. For example, instead of calculating or generating the various device identifiers within the user device 102 itself, the server 112 may generate the device identifiers based on content 206 and/or associated metadata 210 received from the user device 102 or otherwise accessed by the server 112. Other examples of performing the various operations in an alternative device or system are also possible.

In some examples, the various methods described above may be employed for verification and/or authentication of the user device 102 for facilitating other functionality external to the user device 102. For instance, a head unit or similar device in an automobile can employ any of the methods disclosed herein to verify that a mobile user device 102 located within the automobile belongs to a specific user 101. Based on that verification/authentication, the head unit may load implement profile data (e.g., driver seat position, brake pedal location, rear and side mirror orientation, and the like) corresponding to the user 101 within the automobile.

In some situations, an insufficient amount of content 106, or an insufficient amount of a particular type of content 106, may be stored in, or accessible by, a user device 102 for the above methods to be effective immediately. Such examples may occur, for example, when a user 101 first receives the user device 102. The user device 102 and/or the server 112 may detect such a situation, in which case a default or generic user profile (e.g., a profile employed by a particular application 104) reserved for such user devices 102 may be associated with the user device 102 until sufficient content 106 is stored or accessed to facilitate unique identification of the user device 102 and the user 101. In other examples in which a user 101 currently associated with one or more user devices 102 obtains a new user device 102, the new user device 102 may be loaded with content 106 associated with that user 101 from the server 112 or another device in the "cloud," thus facilitating use of the various methods described herein without the use of a default or generic profile.

In view of at least some of the embodiments described herein, one or more types of content (e.g., video files, audio files, still image files, document files, and so on) residing in, or otherwise accessible to, a user device may be employed to identify one or more such user devices with a particular user. Consequently, sensitive identity information corresponding to the user need not be transmitted over a network between a user device and a server to establish correspondence between the user device and the user while maintaining the anonymity of the user. Such embodiments do not require an exact match between the content of multiple user devices of the same user. Moreover, the examples discussed herein may be adaptable to situations in which the content of a particular user device changes over time, and to situations in which two separate applications operating on the same user device access two differing sets of content with the user device. Accordingly, the embodiments discussed herein may adapt to differences in content between user devices and applications, and over extended periods of time.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmissions (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Figure 7:
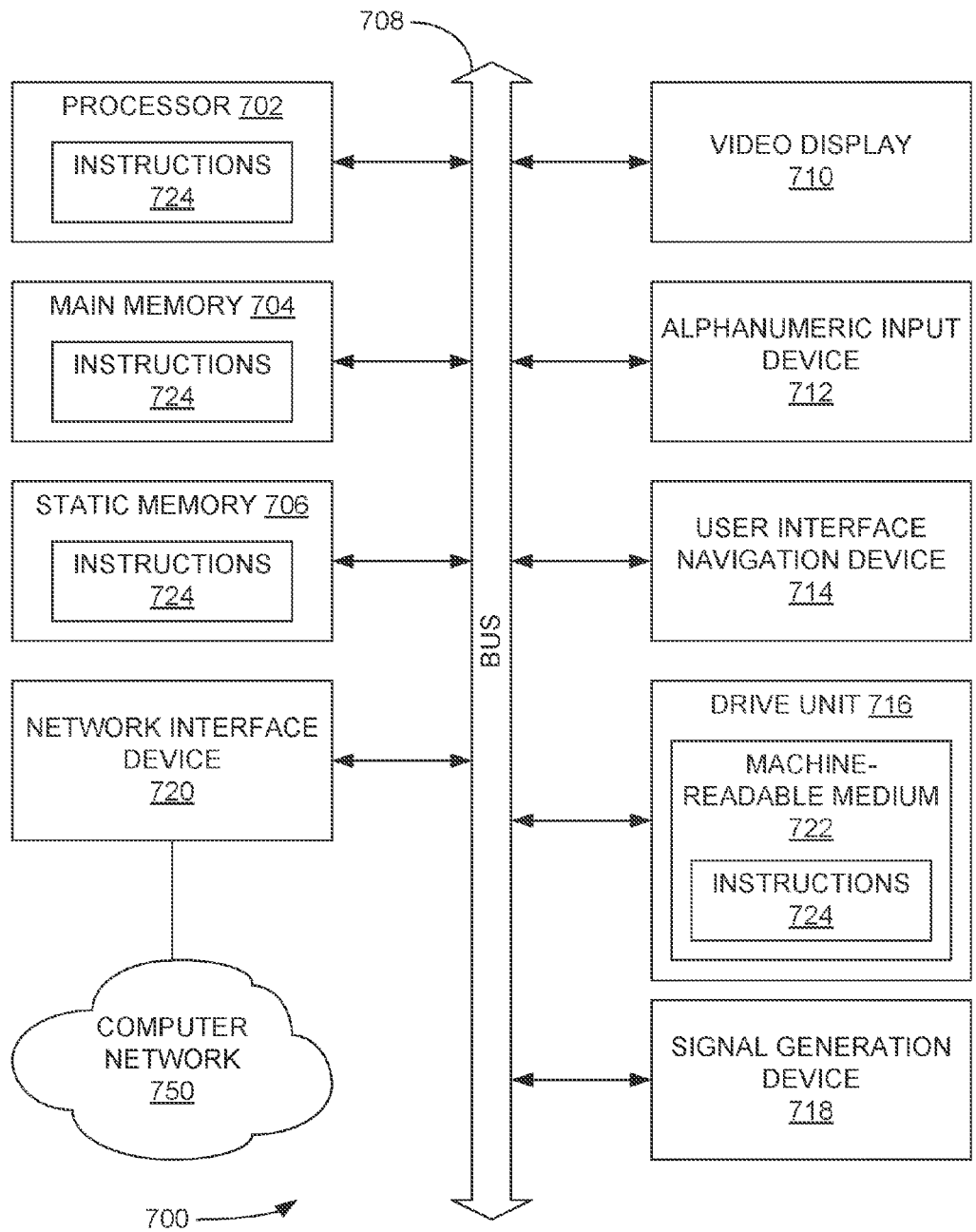
FIG. 7 is a diagrammatic representation of a machine in the example form of a computer system within which a set of instructions for causing the machine to perform any one or more of the methodologies discussed herein may be executed.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and Compact Disc-Read Only Memory (CD-ROM) and Digital Versatile Disc-Read Only Memory (DVD-ROM) disks.

The instructions 724 may further be transmitted or received over a computer network 750 using a transmission medium. The instructions 724 may be transmitted using the network interface device 720 and any one of a number of well-known transfer protocols (e.g., HyperText Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi®, Long-Term Evolution (LTE), and Worldwide Interoperability for Microwave Access (Wi-MAX) networks). The term "transmission medium" shall be taken to include any intangible medium that is capable of storing, encoding, or carrying instructions for execution by the machine, and includes digital or analog communications signals or other intangible media to facilitate communication of such software.

Although the present subject matter has been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing, by one or more hardware processors, metadata of content items accessible by a device on which applications are executable, the content items including distinct and overlapping first and second portions of the content items;
    generating, by the one or more hardware processors executing a first module, a first identifier based on first metadata that describes the first portion of the content items, the first module corresponding to a first application whose access to the content items is limited to the first portion;
    providing the first identifier to a server machine configured to assign the first identifier to a user identifier;
    generating, by the one or more hardware processors executing a second module, a second identifier based on second metadata that describes the second portion of the content items, the second module corresponding to a second application whose access to the content items is limited to the second portion; and
    providing the second identifier to the server machine configured to:
        determine that the first and second portions are overlapping portions of the content items, based on the provided first and second identifiers; and
        assign the user identifier to the second identifier based on the first and second portions being overlapping portions of the content items.

2. The method of claim 1, wherein:
    the first application is limited by first permissions to access only the first portion among the content items; and
    the second application is limited by second permissions to access only the second portion among the content items.

3. The method of claim 1, wherein:
    the generating of the first identifier includes hashing the first metadata that describes the first portion of the content items; and
    the generating of the second identifier includes hashing the second metadata that describes the second portion of the content items.

4. The method of claim 1, further comprising:
    receiving the assigned user identifier from the server machine; and
    configuring the second application to perform a customized operation based on the received user identifier.

5. The method of claim 1, wherein:
    the first portion of the content images includes audio files; and
    the first metadata specifies at least one of play counts of the audio files, sizes of the audio files, or creation dates of the audio files.

6. The method of claim 1, wherein:
    the first portion of the content items includes image files; and
    the first metadata specifies at least one of location data of the image files, sizes of the image files, or creation dates of the image files.

7. The method of claim 1, wherein:
    the first portion of the content items includes video files; and
    the first metadata specifies at least one of play counts of the video files, sizes of the video files, or creation dates of the video files.

8. The method of claim 1, wherein:
    the first portion of the content items includes contact information items; and
    the first metadata specifies contact names of the contact information items.

9. A system comprising:
    one or more processors; and
    a memory storing instructions that, when executed by at least one processor among the one or more processors, cause the system to perform operations comprising:
    accessing metadata of content items accessible by a device on which applications are executable, the content items including distinct and overlapping first and second portions of the content items;
    generating, by a first module, a first identifier based on first metadata that describes the first portion of the content items, the first module corresponding to a first application whose access to the content items is limited to the first portion;
    providing the first identifier to a server machine configured to assign the first identifier to a user identifier;
    generating, by a second module, a second identifier based on second metadata that describes the second portion of the content items, the second module corresponding to a second application whose access to the content items is limited to the second portion; and
    providing the second identifier to the server machine configured to:
        determine that the first and second portions are overlapping portions of the content items, based on the provided first and second identifiers; and
        assign the user identifier to the second identifier based on the first and second portions being overlapping portions of the content items.

10. A non-transitory machine-readable storage medium comprising instructions that, when executed by one or more processors of a machine, cause the machine to perform operations comprising:
    accessing metadata of content items accessible by a device on which applications are executable, the content items including distinct and overlapping first and second portions of the content items;
    generating, by a first module, a first identifier based on first metadata that describes the first portion of the content items, the first module corresponding to a first application whose access to the content items is limited to the first portion;
    providing the first identifier to a server machine configured to assign the first identifier to a user identifier;
    generating, by a second module, a second identifier based on second metadata that describes the second portion of the content items, the second module corresponding to a second application whose access to the content items is limited to the second portion; and providing the second identifier to the server machine configured to:
  determine that the first and second portions are overlapping portions of the content items, based on the provided first and second identifiers; and
  assign the user identifier to the second identifier based on the first and second portions being overlapping portions of the content items.

11. A method comprising:
receiving, by one or more hardware processors, a first identifier generated based on first metadata that describes a first portion of content items accessible by a device on which applications are executable, the content items including a distinct second portion that overlaps the first portion, the first identifier being generated by a first module that corresponds to a first application whose access to the content items is limited to the first portion;
assigning, by the one or more hardware processors, the first identifier to a user identifier;
receiving, by the one or more hardware processors, a second identifier generated based on second metadata that describes the second portion of the content items, the second identifier being generated by a second module that corresponds to a second application whose access to the content items is limited to the second portion;
determining, by the one or more hardware processors, that the first and second portions are overlapping portions of the content items accessible by the device, the determining being based on the received first and second identifiers; and
assigning, by the one or more hardware processors, the user identifier to the second identifier based on the first and second portions being overlapping portions of the content items.

12. The method of claim 11, wherein:
the first application is limited by first permissions to access only the first portion among the content items; and
the second application is limited by second permissions to access only the second portion among the content items.

13. The method of claim 11, wherein:
the received first identifier includes a first hash of the first metadata that describes the first portion of the content items; and
the received second identifier includes a second hash of the second metadata that describes the second portion of the content items.

14. The method of claim 11, further comprising:
providing the assigned user identifier to the device, the providing of the user identifier causing the device to configure the second application to perform a customized operation based on the provided user identifier.

15. The method of claim 11, wherein:
the first portion of the content images includes audio files; and
the first metadata specifies at least one of play counts of the audio files, sizes of the audio files, or creation dates of the audio files.

16. The method of claim 11, wherein:
the first portion of the content items includes image files; and
the first metadata specifies at least one of location data of the image files, sizes of the image files, or creation dates of the image files.

17. The method of claim 11, wherein:
the first portion of the content items includes video files; and
the first metadata specifies at least one of play counts of the video files, sizes of the video files, or creation dates of the video files.

18. The method of claim 11, wherein:
the first portion of the content items includes contact information items; and
the first metadata specifies contact names of the contact information items.

19. A system comprising:
one or more processors; and
a memory storing instructions that, when executed by at least one processor among the one or more processors, cause the system to perform operations comprising:
  receiving a first identifier generated based on first metadata that describes a first portion of content items accessible by a device on which applications are executable, the content items including a distinct second portion that overlaps the first portion, the first identifier being generated by a first module that corresponds to a first application whose access to the content items is limited to the first portion;
  assigning the first identifier to a user identifier;
  receiving a second identifier generated based on second metadata that describes the second portion of the content items, the second identifier being generated by a second module that corresponds to a second application whose access to the content items is limited to the second portion;
  determining that the first and second portions are overlapping portions of the content items accessible by the device, the determining being based on the received first and second identifiers; and
  assigning the user identifier to the second identifier based on the first and second portions being overlapping portions of the content items.

20. A non-transitory machine-readable storage medium comprising instructions that, when executed by one or more processors of a machine, cause the machine to perform operations comprising:
  receiving a first identifier generated based on first metadata that describes a first portion of content items accessible by a device on which applications are executable, the content items including a distinct second portion that overlaps the first portion, the first identifier being generated by a first module that corresponds to a first application whose access to the content items is limited to the first portion;
  assigning the first identifier to a user identifier;
  receiving a second identifier generated based on second tnetadata that describes the second portion of the content items, the second identifier being generated by a second module that corresponds to a second application whose access to the content items is limited to the second portion;
  determining that the first and second portions are overlapping portions of the content items accessible by the device, the determining being based on the received first and second identifiers; and
  assigning the user identifier to the second identifier based on the first and second portions being overlapping portions of the content items.

* * * * *

UNITED STATES PATENT AND TRADEMARK OFFICE
CERTIFICATE OF CORRECTION

PATENT NO.        : 9,769,143 B2
APPLICATION NO.   : 15/140706
DATED             : September 19, 2017
INVENTOR(S)       : Michael Jeffrey, Steven D. Scherf and Markus K. Cremer Page 1 of 1

It is certified that error appears in the above-identified patent and that said Letters Patent is hereby corrected as shown below:

In the Claims

Claim 20, Column 22, Line 53:
Please delete "tnetadata that describes the second portion of the con-" and replace it with -- metadata that describes the second portion of the con- --.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*